United States Patent
Crockett et al.

(10) Patent No.: US 7,224,344 B2
(45) Date of Patent: May 29, 2007

(54) KEY CODE FILTER APPARATUS AND METHOD

(75) Inventors: Timothy W. Crockett, Raleigh, NC (US); Paul D. Kangas, Cary, NC (US); Rex L. Wills, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 10/634,287

(22) Filed: Aug. 5, 2003

(65) Prior Publication Data

US 2005/0030289 A1 Feb. 10, 2005

(51) Int. Cl.
*G09G 5/00* (2006.01)

(52) U.S. Cl. .............................. 345/168; 341/22

(58) Field of Classification Search ........ 345/168–172; 341/22, 24
See application file for complete search history.

(56) References Cited

U.S. PATENT DOCUMENTS

| | | | |
|---|---|---|---|
| 3,617,627 A | 11/1971 | McLean | 178/17 |
| 4,293,849 A | 10/1981 | Lacy | 340/365 |
| 4,581,603 A | 4/1986 | Ingold et al. | 340/365 |
| 4,908,612 A * | 3/1990 | Bromley et al. | 345/159 |
| 4,918,444 A * | 4/1990 | Matsubayashi | 341/25 |
| 5,371,498 A | 12/1994 | Kwon et al. | 341/24 |
| 5,469,159 A | 11/1995 | Fukazawa | 341/22 |
| 6,011,544 A | 1/2000 | Sato | 345/168 |
| 6,429,793 B1 | 8/2002 | Paolini | 341/22 |

FOREIGN PATENT DOCUMENTS

JP 04151711 A * 5/1992

* cited by examiner

*Primary Examiner*—Jimmy H. Nguyen
(74) *Attorney, Agent, or Firm*—Kunzler & McKenzie

(57) ABSTRACT

An apparatus for use in kiosks or other computerized devices for filtering out selected key codes transmitted between an input device, such as a keyboard, and a host computer. The apparatus includes an input port to receive key codes transmitted from a keyboard en route to a host computer or workstation. A key code filter may be used to filter out or block selected key codes, sequences of key codes, and combinations of key codes, and to prevent unauthorized persons from accessing certain functions of the host computer. Key codes blocked or filtered out may be modified in accordance with each particular system. Once selected key codes are filtered out, an output port passes the remaining unblocked key codes to a host computer.

16 Claims, 8 Drawing Sheets

302

RULES TABLE

| Key | Key Code | Rule |
|---|---|---|
| Del (press) | 0x71 | Alt and Ctrl |
| 0 (press) | 0x45 | FALSE |
| c (press) | 0x21 | (Alt and Ctrl) or Ctrl |
| F1 (press) | 0x05 | TRUE |
| R-Alt | 0xE0, 0x11 | FALSE |
| R-Ctrl | 0xE0, 0x14 | FALSE |
| L-Alt | 0x11 | FALSE |
| L-Ctrl | 0x14 | FALSE |

| | Event | Make List | Block List | Keys Sent to Host |
|---|---|---|---|---|
| 1 | Ctrl_Make | {Ctrl} | {} | Ctrl_Make |
| 2 | Alt_Make | {Ctrl, Alt} | {} | Alt_Make |
| 3 | Del_Make | {Ctrl, Alt} | {Del} | |
| 4 | Del_Break | {Ctrl, Alt} | {} | |
| 5 | Alt_Break | {Ctrl} | {} | Alt_Break |
| 6 | Ctrl_Break | {} | {} | Ctrl_Break |

650

| | Event | Make List | Block List | Keys Sent to Host |
|---|---|---|---|---|
| 1 | F1_Make | {} | {F1} | |
| 2 | F1_Break | {} | {} | |

Fig. 6

KEY CODE FILTER APPARATUS AND METHOD

BACKGROUND OF THE INVENTION

1. The Field of the Invention

This invention relates to digital computers, and more particularly, to unique apparatus and methods for blocking selected key codes, sequences of key codes, and combinations of key codes transmitted between a keyboard and a host computer.

2. The Relevant Art

Kiosks of various types and providing a wide variety of services, are currently increasing in popularity. Most kiosks operate using standard computer hardware and include some type of input device such as a keyboard. When designing a kiosk for use by the public, it is often desired to prevent customers from entering certain keys, key sequences, or key combinations from the keyboard. For example, if the input device is a standard keyboard, it may be desired to prevent a user from entering a key combination such as a "CTRL-ALT-DEL" sequence. This key sequence may enable a user of a kiosk to access shut down or reboot commands, or may allow undesired access to applications or data.

Currently, offending keys are blocked using either hardware or software. A typical hardware method is to design a keyboard that does not offer undesired keys to a user. This limits the choices available to a designer and may add expense by requiring a customized keyboard. One typical software solution is to alter drivers or system BIOS on a kiosk host computer so that undesired key codes are ignored. This solution can be impractical since a designer may then become responsible for writing and maintaining keyboard driver code for each operating system used.

Given the drawbacks of current solutions, apparatus and methods are needed to improve currently practice methods for blocking or filtering out selected key codes. Consequently, a need exists for improved apparatus and methods that block or filter out selected keys, sequences of keys, or combinations of keys that a user may input from a keyboard or other input device. What is further needed are such apparatus and methods that are easily installed with an existing keyboard and host computer without requiring modification of an operating system or installing additional applications on the host computer.

In particular, what is needed is an apparatus, physically independent from the host computer and keyboard, that may simply be inserted therebetween to monitor combinations and sequences of key presses, in addition to keys pressed alone, which would provide the desired key code filtration. Accordingly, it would also be an advance in the art to provide a filtration device that could be easily reprogrammed or updated to add, delete, or modify the set of selected keys codes to be blocked.

SUMMARY OF THE INVENTION

Accordingly, an apparatus in accordance with the present invention provides a key code filter to filter out selected key codes transmitted between an input device such as a keyboard and a host computer. It is realized that normally, between an input device and host computer, there are several layers of keyboard code translation. For example, translation exists between keyboard to controller codes, controller to system codes, and resultant ASCII codes. For the sake of the present discussion, the term "key code" will be used interchangeably for any of the aforementioned key codes to provide simplicity, although one term used in technical literature is typically "Kscan" code for codes transmitted between controllers resident in the keyboard and host computer.

In one aspect of the present invention, an apparatus for filtering out selected key codes includes an input port to receive key codes transmitted from an input device such as a keyboard. The input port is operably connected with a key code filter whose function is to block selected key codes, sequences of key codes, and combinations of key codes, as selected by a kiosk or computer station designer. Once the key code filter filters out selected key codes, remaining unblocked key codes are transmitted through an output port to the host computer.

In certain embodiments, the key code filter is physically and functionally independent from the input device and the host computer. However, in other embodiments, the key code filter is located proximate the host computer or the input device, or is actually located within the housing of either.

The key code filter in one embodiment includes a processor configured to process executable and operational data. The key code filter may also include a memory device operably connected to the processor to store the executable and operational data. In one embodiment, the executable and operational data includes a filtering module programmed to filter out desired key codes.

Most keyboards produce key codes that can be classified into two different types. A first type of key code corresponds to the pressing of a particular key on the keyboard. For the sake of the present discussion, this type of key code will be referred to as "make key code." A second type of key code is transmitted from the keyboard to the host computer when the same key is released. This type of key code will be referred to as a "release key code" in this specification.

As stated herein, in certain embodiments, the filtering module associated with the key code filter comprises executable code and operational data stored in memory associated with a processor, such as may be found in a microcontroller. The filtering module may include a rules table containing a list of key codes and associated rules for each key code. Each rule is used to determine whether a key code is blocked or transmitted. Some key codes may be blocked under all circumstances. Other key codes may only be blocked when they are part of a particular sequence of key codes. Yet other key codes are blocked only when they are part of a selected combination of key codes.

In certain embodiments, the filtering module also includes a "make list." The make list is a current tally of make key codes (corresponding to pressed keys) that have been received by the key code filter and transmitted on to the host computer, for which corresponding release key codes have yet been received by the key code filter. That is, if the key code filter receives a "make code" from the input device, the make code is forwarded to the host computer if allowed by the corresponding rule.

An entry corresponding to the make code is entered in the make list until a corresponding "release code" is received by the key code filter. When the release code is received, the release code is forwarded to the host computer and the entry is removed from the make list.

A function of the make list is to keep track of make codes that are received by the key code filter so that combinations of keys can be detected. That is, if a user presses a first key on the keyboard and proceeds to press a second key before releasing the first, this combination can be detected by examining make codes already in the make list.

Likewise, in certain embodiments, the filtering module includes a block list containing a list of make key codes that have been blocked, for which corresponding release key codes have not yet been received by the key code filter. That is, if a "make code" has been received and has been blocked from transmission to the host computer, the make code is stored in a "block list" until a corresponding "release code" is received by the key code filter. Since it may confuse a host computer if a "make code" is blocked, and the corresponding "release code" is received by the host computer, the block list functions to ensure that a release code, corresponding to a blocked make code, is blocked.

In certain embodiments, the functionality of key code filter is provided by a microcontroller. One advantage of using a microcontroller is that most of the functionality of the key code filter is provided by software loaded thereon. A microcontroller includes many needed components in an integrated package, such as a processor, memory, I/O ports, an oscillator, and the like, thereby simplifying the design of the key code filter.

Since microcontrollers and other circuitry within a keyboard operate using power provided by the host computer, the key code filter may also operate using power from the host computer. Since the key code filter is inserted between the host computer and the input device, the key code filter simply taps into the power source provided to the keyboard.

In certain embodiments, the functionality of the key code filter is exclusively provided by hardware. That is, the circuitry within the key code filter is a dedicated hard-wired solution that requires no software. Implementations of this type may be useful in cases where a standardized set of key codes is blocked, and the device will not likely need reprogramming. Moreover, it is possible that a hardware implementation could be less expensive in certain cases, since certain hardware components and software development are not needed.

In other embodiments, the functionality of the key code filter is provided by a combination of hardware and software. That is, a microcontroller or other programmable device is loaded with software to perform key code. In this embodiment, software may be upgraded, as needed, or other software may be loaded or reprogrammed to add or delete specific key codes from those on the filtered list.

In another aspect of the present invention, a method for filtering out selected key codes transmitted between an input device and a host computer intercepts key codes transmitted between an input device and a host computer. Once the key codes are intercepted, the method includes blocking, selected key codes, sequences of key codes, and combinations of key codes. The method forwards unblocked key codes to the host computer.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which:

FIG. 5 is a chart illustrating an example of a rules list for filtering out specific key codes, sequences of key codes, and/or combinations of key codes in accordance with the invention;

FIG. 6 shows two charts illustrating two examples of key sequences that may be received and processed by the key code filter;

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 8, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1A:
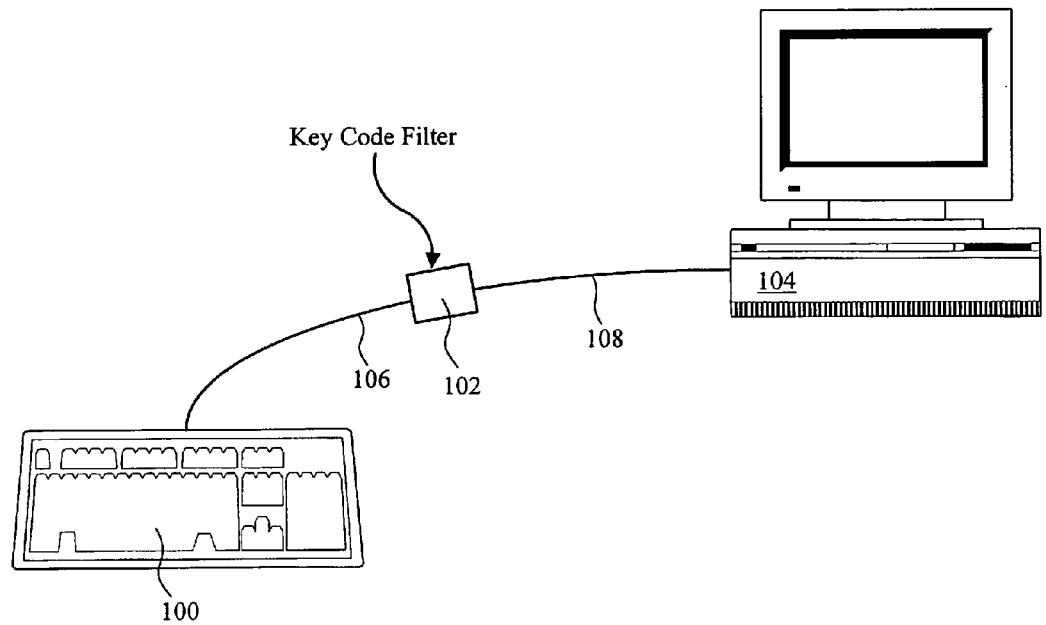
FIG. 1A is a schematic block diagram illustrating one embodiment of a key code filter inserted between a keyboard and a host computer in accordance with the invention.
Figure 1B:
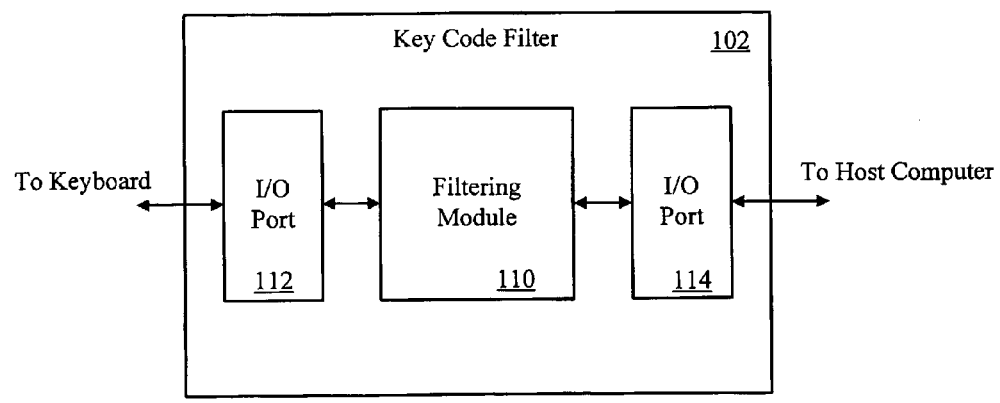
FIG. 1B is a schematic block diagram illustrating one embodiment of the key code filter of FIG. 1A.

Referring to FIGS. 1A and 1B, in one embodiment, a key code filter 102 is inserted between a keyboard 100 and a host computer 104. While the particular embodiment of a keyboard is given here by way of example, it should be readily recognized that the present invention may be used with other types of input devices, including voice recognition modules, touch pads, light activation devices, and the like. Similarly, the host computer may be any computing device, including but not limited to an Internet or networking terminal, a main frame computer, distributive computing, a personal computer, a hand-held computer, and a processor in a customer services kiosk.

A communications link 106, normally coupled directly to the host computer 104 is coupled to the key code filter 102. Likewise an output line 108 couples the key code filter 102 to the host computer 104. As illustrated, the key code filter 102 is an independent device that is physically separate from the keyboard 100 and the host computer 104. However, in other contemplated embodiments, the key code filter 102 is located proximate either the keyboard 100 or the host computer 104, or is actually contained within the housing of either device 100, 102. The key code filter 102 may, in certain embodiments be integrated whit the circuitry of either the keyboard 100 or the computer 104.

In one embodiment depicted in FIG. 1B, the key code filter 102 includes an I/O port 112 for communicating with the keyboard 100 and an I/O port 114 for communicating with the host computer 104. As depicted, the I/O ports 112, 114 are operably connected to a filtering module 110. The filtering module 110 is configured to receive key codes from the I/O ports 114, recognize the key codes, compare those key codes to a list of restricted key codes, sequences of key codes, or combinations of key codes and restrict those key codes from transmission to the host computer 104.

Figure 2:
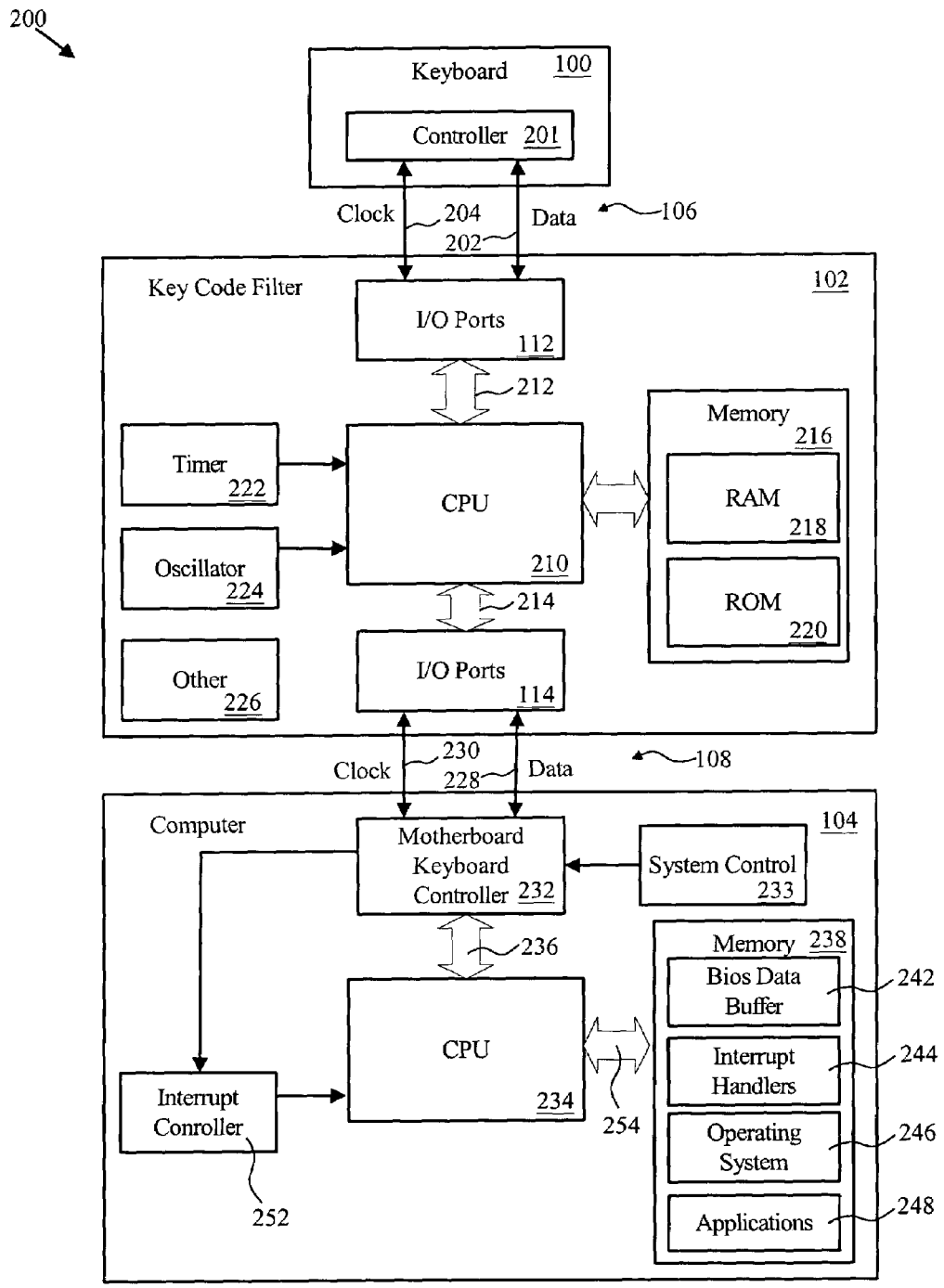
FIG. 2 is a schematic block diagram illustrating one embodiment of various components providing functionality within the keyboard, the key code filter, and the host computer.

Referring to FIG. 2, a key code filtering system 200 depicts specific embodiments of the elements of FIGS. 1A and 1B in greater detail. For example, the depicted key code filter 102 includes one or more input and output ports 112, 114 that receive and transmit data and clock signals 106, 108 to and from the keyboard 100 and the host computer 104. The input and output ports 112, 114 transmit the data and clock signals to a processor 210 or CPU 210. The CPU 210 processes the incoming key codes, and either blocks the key codes, or forwards them to the host computer 104.

As depicted in the embodiment of FIG. 2, the keyboard 100 contains an internal controller 201. The controller 201 is effective to sense when keys are pressed and released on the keyboard 100. When a key is pressed, the controller 201 outputs a "make" key code corresponding to the pressed key. Likewise, when the same key is released, the keyboard controller 201 outputs a corresponding "release" key code.

Both the make and release key codes are represented by a certain number of bits or bytes. In order to transmit the bits or bytes from the keyboard, a clock line 204 may be used to coordinate the transfer. In one embodiment, the clock line 204 indicates the first bit of a key code, times to sample intervening bits, a stop bit, as well bits used for error checking, carried on a data line 202. An I/O port 112 may receive the incoming key codes from the controller 201.

As depicted, the key codes are transmitted to a CPU 210 on a system bus 212. The CPU 210 processes the key codes and determines whether they are to be blocked or forwarded to the host computer 104. If the key code filter 102 is a programmable device, the key code filter 102 includes a memory module containing executable and operational data processable by the processor 210. The executable and operational data is effective to filter out selected key codes, sequences of key codes, or combinations of key codes, as desired for a particular kiosk system or general computing device.

The memory module 216 may include a volatile portion (RAM) 218 and a nonvolatile portion (ROM) 220. When the key code filter 102 is powered up, selected executable and operational data may be transferred from the ROM 220 to the RAM 218. In addition, in certain embodiments, the ROM 220 may be reprogrammed as needed to add or modify key codes to be blocked, or to update the executable and operational data.

The key code filter 104 may include other components as necessary, including but not limited to a timer 222, an oscillator 224, or any other components 226 that may or may not be needed. Certain microcontrollers may provide any or all of components used to implement the key code filter 102, in addition to certain components that may be present but not used.

An I/O port 114 receives the unblocked key codes from the CPU 210 on a bus 214, and forwards those key codes on to the host computer 104 or workstation 104 by way of data lines 228 and clock lines 230. The host computer 104 includes a dedicated controller 232 located on the motherboard to interface with a keyboard 100, or in this case, the key code filter 102. The keyboard controller 232 acts as an interface between the keyboard 100 and a CPU 234, located within the host computer 104.

For example, when the keyboard controller 232 receives a key code from the key code filter 102, the keyboard controller 232 may send an interrupt to an interrupt controller 252. The interrupt controller 252 may then interrupt those tasks currently being executed by the CPU 234. The CPU 234 may then respond to the interrupt by retrieving the key code and transmitting it to its destination. Because current CPUs 234 operate at such great speeds, even relatively numerous and frequent interruptions caused by a skilled typist will cause very little performance degradation of the CPU 234.

The host computer 104 includes volatile and nonvolatile memory that may be used as data buffers 242, memory buffers 242 used to temporarily hold key codes while being transferred to and from the CPU 234, and interrupt handlers 244 used to respond to incoming key codes. The memory 238 may also include the operating system 246 to act as an interface between applications 248 attempting to access keyboard information. A system control module 233 may be used to send control commands to the motherboard controller 232.

The depicted system 200 of FIG. 2 is merely provided as a high level aid for understanding the function of the key code filter 102 with respect to the keyboard 100 and the host computer 104, and is in no way intended to limit the scope of the present invention. In fact, there are many different ways the key code filter 102 could be designed, while still providing a filter 102 that can operate independently from the keyboard 100 and the host computer 104.

Figure 3:
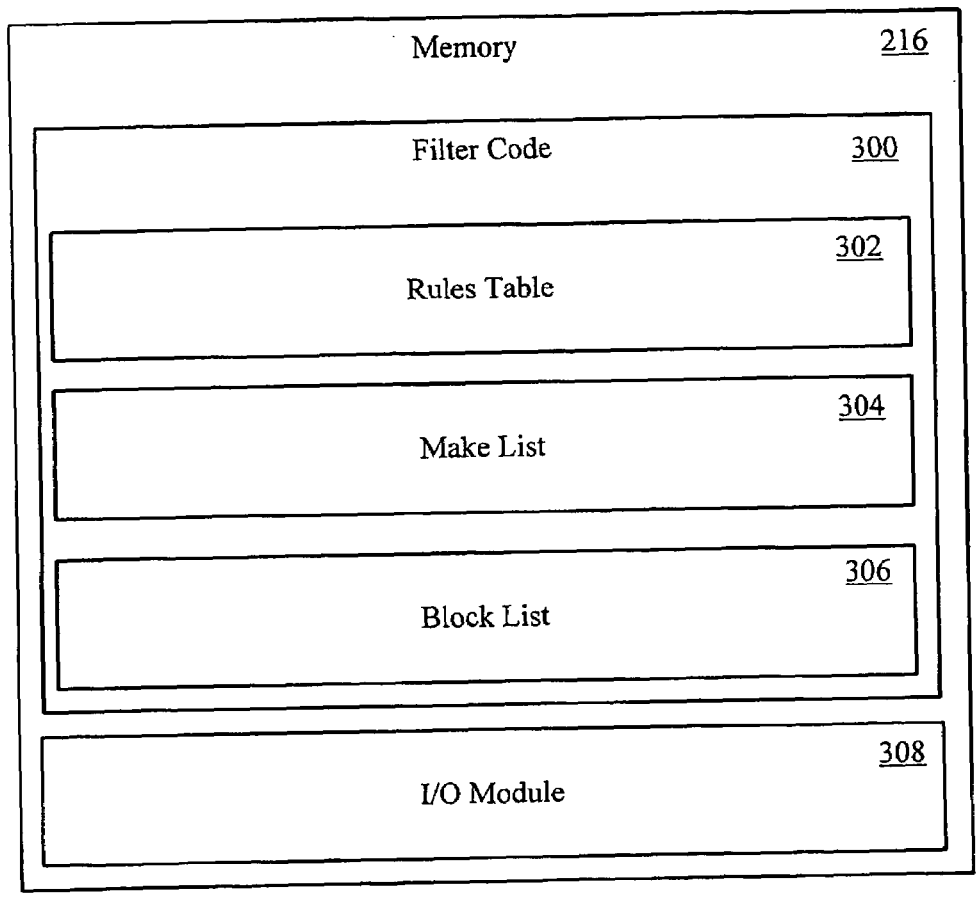
FIG. 3 is a schematic block diagram illustrating one embodiment of various functional modules contained within the memory of the key code filter.

With respect to FIG. 3, the memory module 216, as illustrated in FIG. 2, includes various executable code and operational data to provide certain functions of the key code filter 102. For example, in certain embodiments, the memory module 216 includes filter code 300. The filter code 300 includes the necessary logic to block selected key codes, while transmitting other selected key codes.

In certain embodiments, the filter code 300 includes a rules table 302. The rules table 302 includes a list of rules corresponding to each key code that can be received by the key code filter 102. The rules for certain key codes may be to transmit the key code. The rules for other key codes may be to block those key codes. Yet other rules may block certain key codes only if other key codes have been received first, indicating that a certain combination of key codes is to be blocked.

In selected embodiments, the filter code 300 includes a "make list" 304. The make list 304 is a list of make key codes that have been transmitted (e.g. not blocked), for which a corresponding release code has not yet been received. Likewise, in certain embodiments, the filter code 300 includes a "block list" 306 that lists each make code that has been blocked, and for which a corresponding release code has not yet been received. The make list 304 is used to keep track of keys that have been pressed but not yet released, in order to monitor combination of keys that are pressed simultaneously. For example, certain keys may be transmitted when pressed or released alone. However, these same keys may be blocked if pressed in combination with other keys. The make list 304 aids in keeping track of these combinations.

Likewise, if certain make key codes are blocked, it may be confusing to a host computer if a corresponding release code is received. The block list 306 is used to keep track of make key codes that have been blocked. In this manner, when the corresponding release key code is received, it is also blocked to avoid this type of confusion.

The memory module 216 may also include an I/O module 308 that may be responsible for inputting and outputting key codes from the key code filter 102. This module 308 may help coordinate the input and output of key codes in accordance with timing protocols that are used between a keyboard 100 and a host computer 104.

Figure 4:
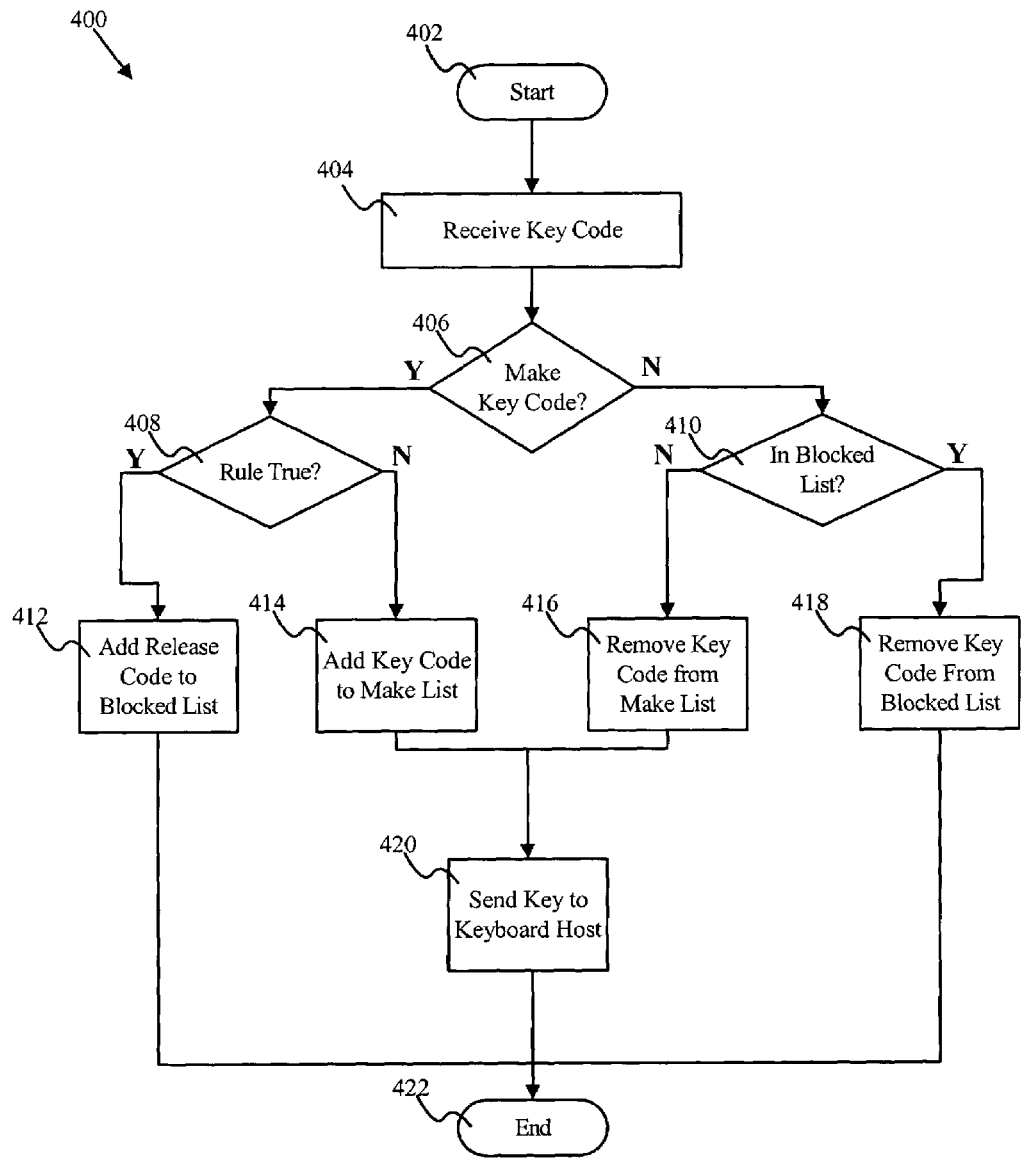
FIG. 4 is a schematic block diagram illustrating one embodiment of an algorithm for filtering key codes.

Referring to FIG. 4, in one embodiment, a method 400 for filtering key codes begins 402 and then proceeds to receive 404 a key code from the keyboard 100. A make test 406 determines whether the key code is a make key code. If the key code is a make key code, a rule test 408 tests whether the rule corresponding to the make key code is true. In this example, if a rule is "true," then a key code is blocked and is not transmitted to the host computer 104. Thus, if at the rule test 408, the rule is true, the release code corresponding to the make code is added 412 to the blocked list and the process is ended 422 without transmitting the make code to the host computer 104.

If, however, at the rule test 408 the rule is false, the make key code is added 414 to the make list and the make key code is sent to the keyboard host in the host computer 104.

Returning back to the make test 406, if the key code received at step 404 is not a make key code, then it is a release key code, and the process 400 is passed to a block test 410. If at the block test 410, the release key code is in the block list, the release key code is removed 418 from the blocked list and the process 400 is ended 422 without transmitting the release code to the host computer 104. If, however, at the block test 410, the release code is not in the blocked list, the corresponding key code is removed 416 from the make list and the release code is transmitted 420 to the keyboard host in the host computer 104. This process 400 may be more easily understood from examples presented below as part of the discussion of FIG. 6.

Referring to FIG. 5, in one embodiment, a rules table 302 includes a key column 502, a key code column 504, and a rule column 506. For example a "Del" key 508 (Delete) may have a key code 0X17. A rule corresponding to the "Del" key may be "Alt and Cntr." Thus, if the "Del" key is pressed while the "Alt" and "Cntr" keys are also pressed, then the rule will be true, and the "Del" key will be blocked. This prevents a user from pressing the "CTRL-ALT-DEL" sequence, which in many systems would shut down or reboot the host computer 104. However, by the same token, if the "Del" key is pressed and one or both of the "Alt" and "Ctrl" keys are not pressed, then the rule will be false and the key will be passed on and not blocked.

In a similar manner, if a user presses the "0" key 510, the rule for this key is "FALSE," so the key code is transmitted to the host computer 104. If a user presses the "c" key 512, the key is only blocked if it is pressed while both keys "Alt" and "Ctrl" are pressed, or if the "Ctrl" key is pressed by itself. If a user presses the "F1" key 514, the corresponding rule is true, and the key code is blocked from transmission. Likewise, if a user presses any of the "R-Alt" (right hand Alt key) 516, "R-Ctrl" 518, "L-Alt" 520, or "L-Ctrl" 522 keys, the rules for these keys 516, 518, 520, 522 are false, and the codes are transmitted to the host computer 104. By reprogramming the key code filter 102, rules may be added, deleted, or modified from the rules table 302 as needed, to block or transmit selected key codes.

Referring to FIG. 6, while referring generally to FIG. 4, a "CTRL-ALT-DEL" key sequence 600 may be used by way of example to illustrate the function of the present invention. The key sequence 600 may be characterized by an event column 602, a make list column 604, a block list column 606, and a column 608 listing the keys sent to the host computer 104. For example, the key sequence 600 may begin with the pressing 610 of the "Ctrl" key. In this case, the rule for the "Ctrl" make key code is "FALSE," so the "Ctrl" make key code is transmitted to the host computer 104, and an entry corresponding to the "Ctrl" key is placed in the make list.

A second event 612 may be the pressing of the "Alt" key 612. The rule for the "Alt" key is also "FALSE," so the Alt make key code is transmitted to the host computer 104 and an entry corresponding to the "Alt" key is added to the make list.

However, when the "Del" key is pressed 614, since the "Ctrl" and "Alt" keys are also pressed, the rule for this key is "TRUE," so this key is blocked and an entry is made in the block list. When the "Del" key is released, a "Del" release key code is received. Since an entry corresponding to the "Del" key is in the blocked list, the "Del" release key code is blocked and the "Del" entry is removed from the block list 606.

The release of the "Alt" key is the next event 618 to occur. When this occurs, the "Alt" release key code is transmitted to the host computer 104, and the "Alt" entry is removed from the make list. Likewise, the release of the "Ctrl" key is the next event 620 to occur. When this occurs, the "Ctrl" release key code is transmitted to the host computer 104 and the "Ctrl" entry is removed from the make list. Thus, in this manner, the "CTRL-ALT-DEL" key sequence is blocked from the host computer 104.

In a second key sequence 650, shown by way of example, the "F1" key is pressed 652. Since the rule for this key is "TRUE," the "F1" make key code is blocked from transmission, and an "F1" entry is made in the block list 606. When the "F1" key is released 654, the "F1" release key code is blocked from transmission and the "F1" entry is removed from the "block" list.

Figure 7:
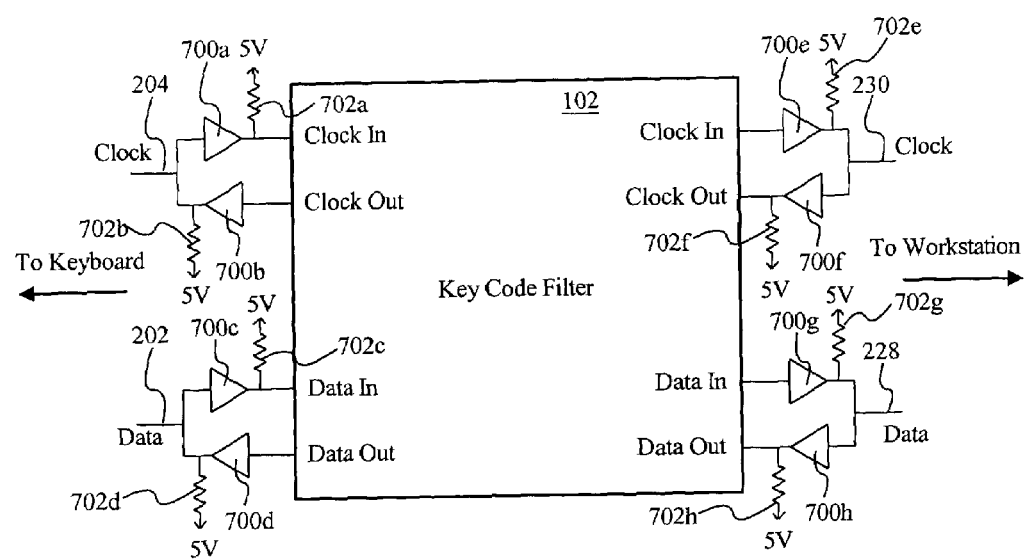
FIG. 7 is a schematic diagram illustrating one embodiment of circuitry that is used with the key code filter to facilitate the reception and transmission of data and clock signals between the keyboard and the host computer.

Referring to FIG. 7, the key code filter 102 may be implemented using various circuit components in order to effectively receive and transmit information to and from the keyboard 100 and the host computer 104. For example, the clock and data lines 202, 204, 228, 230 are used bi-directionally in FIG. 7 to enable communication between the keyboard 100 and the host computer. In order to prevent contention caused by either the keyboard 100 or the host computer 104 trying to communicate at the same time as the key code filter 102, buffers 700a–h may be used.

A single set of communication lines may be used to share signaling in two directions by using open collector buffers 700a–h and software control to monitor activity on the bi-directional lines 202, 204, 228, 230. The buffers 700a–h provide isolation between respective transmitting and receiving lines on the keyboard microcontroller 201 and the computer keyboard controller 232. Each of the buffers 700a–h may be an open collector buffer 700a–h. The properties of the open collector buffers 700a–h are such that the buffers 700a–h never output a "high" voltage. Rather, the buffers 700a–h use two states: ground potential or high impedance (open circuit). The resistors 702a–h serve to prevent shorts between system voltage and ground potential.

Figure 8:
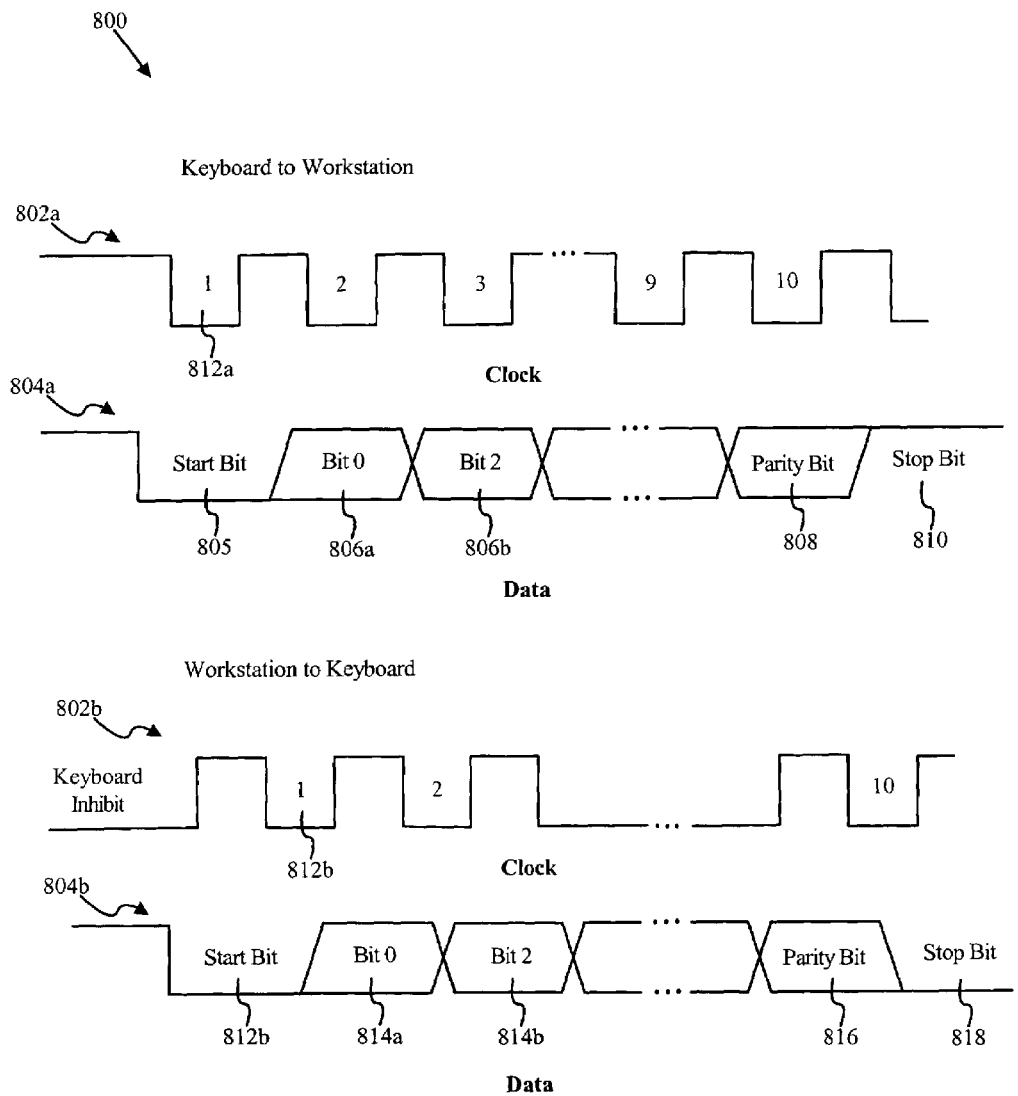
FIG. 8 is a timing diagram illustrating one embodiment of timing and relationships of clock and data signals transmitted between a keyboard and a host computer.

Referring to FIG. 8, typically, the keyboard controller 232, located on the motherboard, communicates with the keyboard 100 over a serial line 106, 108. Likewise, the key code filter 102 communicates with both the keyboard 100 and the host computer 104 in the same manner. A clock line 230 carrying a synchronized clock signal 802a is provided from the motherboard controller 232 to the key code filter 102. Likewise, a data line 228 carrying a serial data frame 804a of 11 bits may be transmitted consisting of a start bit 805, eight data bits 806, an odd parity bit 808, and a stop bit 810.

In an idle state, both the data 804a and clock 802a signals are high. To begin sending data to the motherboard keyboard controller 232, the key code filter 102 sends a start bit 805 on the data line 228. The motherboard keyboard controller 232 responds by starting the clock signal 802a high, with a first clock pulse 812a going low. The clock 802a continues and the key code filter 102 samples each data bit 806a, 806b as the clock 802a goes low. At the 11$^{th}$ clock cycle, the key code filter 102 sends a stop bit 810 and the clock line 802a returns to an idle high state.

The process described may also be used by the host computer 104 to send data to the key code filter 102. For example, in an idle state, both the data 804b and clock 802b signals are high. To begin sending data to the key code filter 102, the motherboard keyboard controller 232 sends a start bit 812b on the data line 228. The key code filter 102 responds by starting the clock signal 802b, with the first pulse 812b going low. Under normal operation, the clock 802b is continued with each data bit 814a, 814b, 816 being sampled as the clock 802b goes low. At the 11$^{th}$ clock cycle, the motherboard keyboard controller 232 sends the stop bit 818 and the clock signal 802b returns to its high idle state.

Communication between the key code filter 102 and the keyboard 100 functions in much the same say as between the key code filter 102 and the keyboard motherboard controller 232, as has been described. In selected embodiments, the transmission of key codes from the computer 104 to the keyboard 100 is transparent with no filtering. In other embodiments, the transmission of key codes therebetween is filtered in the same manner as from the keyboard 100 to the computer 104. The described method of communication between components 100, 102, 104 is simply one example of how communication may occur. Obviously, as newer systems are developed, the method of communication may change. However, any suitable method of communication between the keyboard 100, the key code filter 102, and the host computer 104 are certainly considered to be within the scope of the present invention.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. An apparatus for filtering out selected key codes transmitted between a keyboard and a host computer, the apparatus comprising:

an input port configured to receive a stream of key codes transmitted from a keyboard, wherein key codes of the stream of key codes comprise make key codes corresponding to keys that are pressed, and release key codes corresponding to keys that are released, and wherein each key on the keyboard is characterized by a unique make key code and a unique release key code;

a filtering module, operably connected with the input port and storing a rules table containing key codes, combinations of key codes, and rules associated with each key code and the combinations of key codes, each rule specifying whether a key code and combination of key codes is to be blocked or transmitted, a make list storing a list of make key codes that have been received and transmitted to the host computer and for which corresponding release key codes have not been received, and a block list storing a list of make key codes that have been received and blocked from the host computer and for which corresponding release key codes have not been received, wherein the filtering module identifies combinations of key codes as the key codes of the make list, the filtering module configured to block only key codes and combinations of key codes of the stream of key codes selected in accordance with the rules table; and an output port, operably connected with the filtering module, the output port configured to pass unblocked key codes to a host computer, wherein the combination of key codes corresponds to a combination of keys being pressed simultaneously.

2. The apparatus of claim 1, wherein the filtering module is implemented independent of the keyboard and the host computer.

3. The apparatus of claim 1, wherein the filtering module further comprises a processor configured to execute computer code for blocking the key codes and the combinations of key codes.

4. The apparatus of claim 3, wherein the filtering module further comprises a memory device connected to the processor for storing the computer code.

5. The apparatus of claim 1, wherein the filtering module comprises a microcontroller.

6. The apparatus of claim 5, wherein the microcontroller is configured to operate using power received from the host computer.

7. The apparatus of claim 1, wherein the functionality of the filtering module is provided by a combination of electrical hardware and computer software executing on a CPU.

8. The apparatus of claim 1, wherein the filtering module is located proximate to at least one of the keyboard and the host computer.

9. A method for filtering out selected key codes transmitted between a keyboard and a host computer, the method comprising:
   intercepting a stream of key codes transmitted between a keyboard and a host computer, wherein key codes of the stream of key codes comprise make key codes corresponding to keys that are pressed and release key codes corresponding to keys that are released, and wherein each key on the keyboard is characterized by a unique make key code and a unique release key code;
   testing the key codes with a rules table containing key codes, combinations of key codes and rules associated with each key code and the combinations of key codes, each rule specifying whether a key code and combination of key codes is to be blocked or transmitted;
   testing the key codes of the stream of key codes with a make list containing a list of make key codes that have been received and transmitted to the host computer and for which corresponding release key codes have not been received;
   testing the key codes of the stream of key codes with a block list containing a list of make key codes that have been received and blocked from the host computer and for which corresponding release key codes have not been received;
   blocking, independently from the keyboard and host computer, only key codes and combinations of key codes of the stream of key codes selected in accordance with the rules table; and
   passing unblocked key codes from the stream of key codes to the host computer, wherein the combination of key codes corresponds to a combination of keys being pressed simultaneously.

10. The method of claim 9, wherein blocking further comprises blocking with a combination of hardware and software.

11. The method of claim 9, wherein a memory device stores the rules table and the method further comprises reprogramming the memory device to alter the rules.

12. A system for filtering out selected key codes transmitted between a keyboard and a host computer, the system comprising:
   a keyboard configured to generate key codes of a stream of key codes, wherein the key codes comprise make key codes corresponding to keys that are pressed and release key codes corresponding to keys that are released, and wherein each key on the keyboard is characterized by a unique make key code and a unique release key code;
   a key code filter storing a rules table containing key codes, combinations of key codes and rules associated with each key code and the combinations of key codes, each rule specifying whether a key code and combination of key codes is to be blocked or transmitted a make list storing a list of make key codes that have been received and transmitted to the host computer and for which corresponding release key codes have not been received, and a block list storing a list of make key codes that have been received and blocked from the host computer and for which corresponding release key codes have not been received, wherein the key code filter identifies combinations of key codes as the key codes of the make list, the key code filter configured to receive a stream of key codes from the keyboard and block only key codes, and combinations of key codes of the stream of key codes selected in accordance with the rules table; and
   a host computer configured to receive unblocked key codes from the key code filter, wherein the combination of key codes corresponds to a combination of keys being pressed simultaneously.

13. The system of claim 12, wherein the key code filter is implemented independently of the keyboard and the host computer.

14. An apparatus for filtering out selected key codes transmitted between a keyboard and a host computer, the apparatus comprising:
   a key code filter configured to intercept a stream of key codes transmitted between a keyboard and a host computer, wherein key codes of the stream of key codes comprise make key codes corresponding to keys that are pressed, and release key codes corresponding to keys that are released, and wherein each key on the keyboard is characterized by a unique make key code and a unique release key code and to test the intercepted key codes with a rules table containing key codes, combinations of key codes, and rules associated with each key code and the combinations of key codes, each rule specifying whether a key code and combination of key codes is to be blocked or transmitted, a make list storing a list of make key codes that have been received and transmitted to the host computer and for which corresponding release key codes have not been received, and a block list storing a list of make key codes that have been received and blocked from the host computer and for which corresponding release key codes have not been received, wherein the key code filter identifies combinations of key codes as the key codes of the make list; and
   the key code filter further configured to block transmission of only key codes, and combinations of key codes of the stream of key codes selected in accordance with the rules table, wherein the combination of key codes corresponds to a combination of keys being pressed simultaneously.

15. A software program product comprising a CPU-useable medium having a CPU-readable program, wherein the CPU-readable program when executed on a CPU causes the CPU to:
   receive key codes from a keyboard, wherein key codes comprise make key codes corresponding to keys that are pressed, and release key codes corresponding to keys that are released, and wherein each key on the keyboard is characterized by a unique make key code and a unique release key code;
   test the key codes with a rules table containing key codes, combinations of key codes and rules associated with each key code and the combinations of key codes, each rule specifying whether a key code and combination of key codes is to be blocked or transmitted;
   test the received key codes with a make list containing a list of make key codes that have been received and transmitted to the host computer and for which corresponding release key codes have not been received;
   test the received key codes with a block list containing a list of make key codes that have been received and blocked from the host computer and for which corresponding release key codes have not been received and wherein blocking one of selected key codes and combinations of key codes comprises consulting the block list; and block from transmission to a host computer, independently from the keyboard and the host computer, only a key code set selected in accordance with the rules table, the key code set selected from a key code, and a combinations of key codes, wherein the combination of key codes corresponds to a combination of keys being pressed simultaneously.

16. An apparatus for filtering out selected key codes transmitted between a keyboard and a host computer, the apparatus comprising:
   a filtering module configured to receive a stream of key codes and block at least one of selected key codes, and combinations of key codes, wherein key codes of the stream of key codes comprise make key codes corresponding to keys that are pressed, and release key codes corresponding to keys that are released, and wherein each key on the keyboard is characterized by a unique make key code and a unique release key code, the filtering module storing:
      a rules table containing key codes, combinations of key codes, and rules associated with each key code and the combinations of key codes, each rule specifying whether a key code and combination of key codes is blocked or transmitted;
      a make list containing a list of make key codes that have been received and transmitted to the host computer and for which corresponding release key codes have not been received;
      a block list containing a list of make key codes that have been received and blocked from the host computer and for which corresponding release key codes have not been received; and
   the filtering module further configured to block only key codes and combinations of key codes of the stream of key codes selected in accordance with the rules table, wherein the combination of key codes corresponds to a combination of keys being pressed simultaneously.

* * * * *